United States Patent [19]
Trostle

[11] Patent Number: 5,919,257
[45] Date of Patent: Jul. 6, 1999

[54] NETWORKED WORKSTATION INTRUSION DETECTION SYSTEM

[75] Inventor: Jonathan Trostle, Provo, Utah

[73] Assignee: Novell, Inc., Provo, Utah

[21] Appl. No.: 08/907,523

[22] Filed: Aug. 8, 1997

[51] Int. Cl.$^6$ .................................................. G06F 12/14
[52] U.S. Cl. ........................................ 713/200; 713/201
[58] Field of Search ............................ 395/186, 187.01, 395/188.01, 500, 652; 380/4, 3, 25, 30; 340/825.31, 825.34

[56] References Cited

U.S. PATENT DOCUMENTS

| | | | |
|---|---|---|---|
| 5,196,840 | 3/1993 | Leith et al. ............................ | 340/825.3 |
| 5,202,997 | 4/1993 | Arato ....................................... | 395/725 |
| 5,204,961 | 4/1993 | Barlow ..................................... | 395/725 |
| 5,210,795 | 5/1993 | Lipner et al. ............................. | 380/23 |
| 5,287,519 | 2/1994 | Dayan et al. ............................. | 395/700 |
| 5,313,637 | 5/1994 | Rose ......................................... | 395/725 |
| 5,341,422 | 8/1994 | Blackledge, Jr. et al. .................. | 380/4 |
| 5,349,642 | 9/1994 | Kindgon .................................... | 380/25 |
| 5,355,489 | 10/1994 | Bealkowski et al. .................... | 395/500 |
| 5,426,775 | 6/1995 | Boccon-Gibod ........................ | 395/575 |
| 5,444,850 | 8/1995 | Chang ................................... | 395/200.1 |
| 5,448,045 | 9/1995 | Clark ............................................ | 380/4 |
| 5,465,357 | 11/1995 | Bealkowski et al. .................... | 395/700 |
| 5,608,801 | 3/1997 | Aiello et al. ............................... | 380/46 |
| 5,701,463 | 12/1997 | Peter ........................................ | 713/201 |
| 5,701,491 | 12/1997 | Dunn et al. .............................. | 395/712 |
| 5,710,817 | 1/1998 | Sjooquist ................................... | 380/25 |
| 5,740,371 | 4/1998 | Wallis ................................. | 395/200.59 |
| 5,828,888 | 10/1998 | Kozaki et al. ........................... | 395/712 |

OTHER PUBLICATIONS

The X–Lock Virus Checker, 1992.

*Primary Examiner*—Robert W. Beausoliel, Jr.
*Assistant Examiner*—Pierre Eddy Elisea
*Attorney, Agent, or Firm*—Cesari & McKenna, LLP

[57] ABSTRACT

During pre-boot (i.e., the period of time prior to initiating operation of the workstation operating system), a networked workstation performs an intrusion detection hashing function on selected workstation executable program(s). A computed hash value calculated by the hashing operation is compared against a trusted hash value that is downloaded from a server in order to detect illicit (i.e., authorized) changes to the selected workstation executable programs.

16 Claims, 6 Drawing Sheets

NETWORKED WORKSTATION INTRUSION DETECTION SYSTEM

CROSS REFERENCE TO RELATED APPLICATIONS

This application contains subject matter related to the following commonly assigned, co-pending U.S. patent application: Ser. No. 08/828,724 filed Mar. 23, 1997, entitled "Trusted Workstation in a Networked Client Server Computing System".

TECHNICAL FIELD

The present invention relates to computer systems, and in particular to detecting unauthorized changes to executable programs within a networked client/server computer system.

BACKGROUND OF THE INVENTION

Client/server computing has become quite a popular architecture in both system and large organizations. As known, these systems include a computer system which operates as a server for a plurality of personal computers and/or workstations, which are generally connected to the server via a network connection comprising a local area network (LAN) or a wide area network (WAN).

Client/server computing networks have dramatically increased and facilitated access to information. However, due to the ubiquitous nature of computer networks the threat to the integrity of information stored on network resources due to "hackers"/"attackers" and malicious software components (e.g., operating system and application program viruses) has also increased. Threats include any person, place or thing which poses some danger to a network asset. Passswords and other similar operating system level security features often only make it difficult for the hacker/attacker to gain access to the network. However, a patient and capable hacker/attacker can generally bypass most conventional operating system level protections.

Intrusion detection programs (i.e., virus checking programs) are commonly used in order to detect unauthorized modifications to executable programs. However, a particular problem with these intrusion detection programs is that they operate only after the operating system has been started. Therefore, the intrusion detection program is untrusted, and can be altered by a hacker since it operates after the operating system has initiated operation. For example, the intrusion detection software may be attacked by a "Trojan horse", which is generally defined as a piece of code embedded in a useful program for nefarious purposes, such as to covertly steal information, and which can arrange to have itself restarted on every system reboot. Therefore, the integrity of a intrusion detection program which operates following system boot is suspect due to its vulnerability to attack, by for example, a Trojan horse. In addition, prior art workstation intrusion detection programs are cumbersome on the user, since they often require the user to use a floppy drive and manually download virus signature files to the workstation.

Therefore, there is a need for a more secure, user friendly technique for detecting illicit changes to executable programs.

SUMMARY OF THE INVENTION

An object of the present invention is to detect illicit changes to executable programs within a workstation.

Briefly, according to the present invention, during pre-boot (i.e., the period of time prior to initiating operation of the workstation operating system), a networked workstation performs an intrusion detection hashing function on selected workstation executable program(s). A computed hash value calculated by the hashing operation is compared against a trusted hash value that is downloaded from a server in order to detect illicit (i.e., unauthorized) changes to the selected workstation executable programs.

The workstation includes a network interface card (NIC) through which the workstation communicates over the network. Following a hardware reset of the workstation, the workstation contacts a network server and provides the workstation medium access control (MAC) address to the server. The workstation can obtain the server address by using the known service access port (SAP) advertisement protocol. Pre-boot modules are then downloaded to the workstation over the network from the server under the control of instructions resident in an adapter basic input/output system (BIOS) on the NIC. The NIC may be located on an expansion board separate (e.g., ISA or PCI compatible) from the workstation motherboard, or on the motherboard. To enhance security, the pre-boot modules may be signed using a root private key; a root public key is stored in the NIC BIOS and used by the workstation to decrypt the signed pre-boot modules.

Once the pre-boot modules are successfully downloaded, the workstation executes the modules to perform a login—identification and authentication (I & A) function for the user, and to perform the intrusion detection hashing function on the selected workstation executable programs. A hash function is a mathematical transformation that takes a message of arbitrary length (e.g., the selected executable programs) and computes from it a fixed length number (i.e., the computed hash value). Once execution of the pre-boot modules is complete, the NIC BIOS transfers code execution to a workstation system BIOS to complete the initialization of the workstation.

The instructions resident in the NIC BIOS include executable code which communicates with the server to establish the connection with the server in order to download the pre-boot modules and validate the modules using the stored root public key.

The pre-boot modules executed by the workstation to perform the intrusion detection hashing function communicate the user identity to the server. The server then accesses a profile of the user (i.e., a user object which includes information indicative of the application programs resident on the user's workstation) to determine the executable programs resident on the user's workstation, and selects certain of these executable programs to be checked by the intrusion detection hashing function. Upon making the selection, the server responds to the workstation by transmitting the identity of the selected workstation executable programs, and the trusted hash value(s) associated with the selected workstation executable programs. The server can compute the trusted hash value(s) by performing the hashing function on trusted copies of the selected workstation executable programs stored in the server. Alternatively, the server may include a database of trusted hash values each uniquely associated with an executable program.

The workstation executes the hashing function on the selected executable programs stored in workstation memory (disk or RAM) to calculate a computed hash value. The workstation compares this value with the trusted hash value downloaded from the server to determine if any illicit changes have been made to the selected executable programs. If changes are detected, the user (and/or the network system administrator) is notified in order to take corrective action. Otherwise, the initialization proceeds and the workstation is booted. Alternatively, a computed hash value may be calculated separately for each selected workstation executable program, and compared against the trusted hash value downloaded from the server for that executable program.

During each pre-boot, the server can select different workstation executable programs to be checked by the intrusion detection hashing function. In general, however, certain executable programs such as browsers, mail programs and certain portions of the operating system should be checked following every reset. In addition to checking these programs, a portion of the remaining executable programs should also be checked during each pre-boot and the selection should involve some randomness, with a goal of checking all the workstation executable programs within a reasonable number of workstation resets.

An advantage of the present invention is that it provides a trusted technique for detecting illicit changes to executable programs (e.g., a "Trojan horse" appended to an executable program by a computer hacker).

A further advantage of the present invention is that it is transparent to a user. That is, the hash function and the trusted hash value are automatically downloaded to the workstation during pre-boot, and the hashing function is automatically executed by the workstation during pre-boot to detect illicit changes to the executable files resident on the workstation.

These and other objects, features and advantages of the present invention will become more apparent in light of the following detailed description of preferred embodiments thereof, as illustrated in the accompanying drawings.

DESCRIPTION OF A PREFERRED EMBODIMENT

Figure 1:
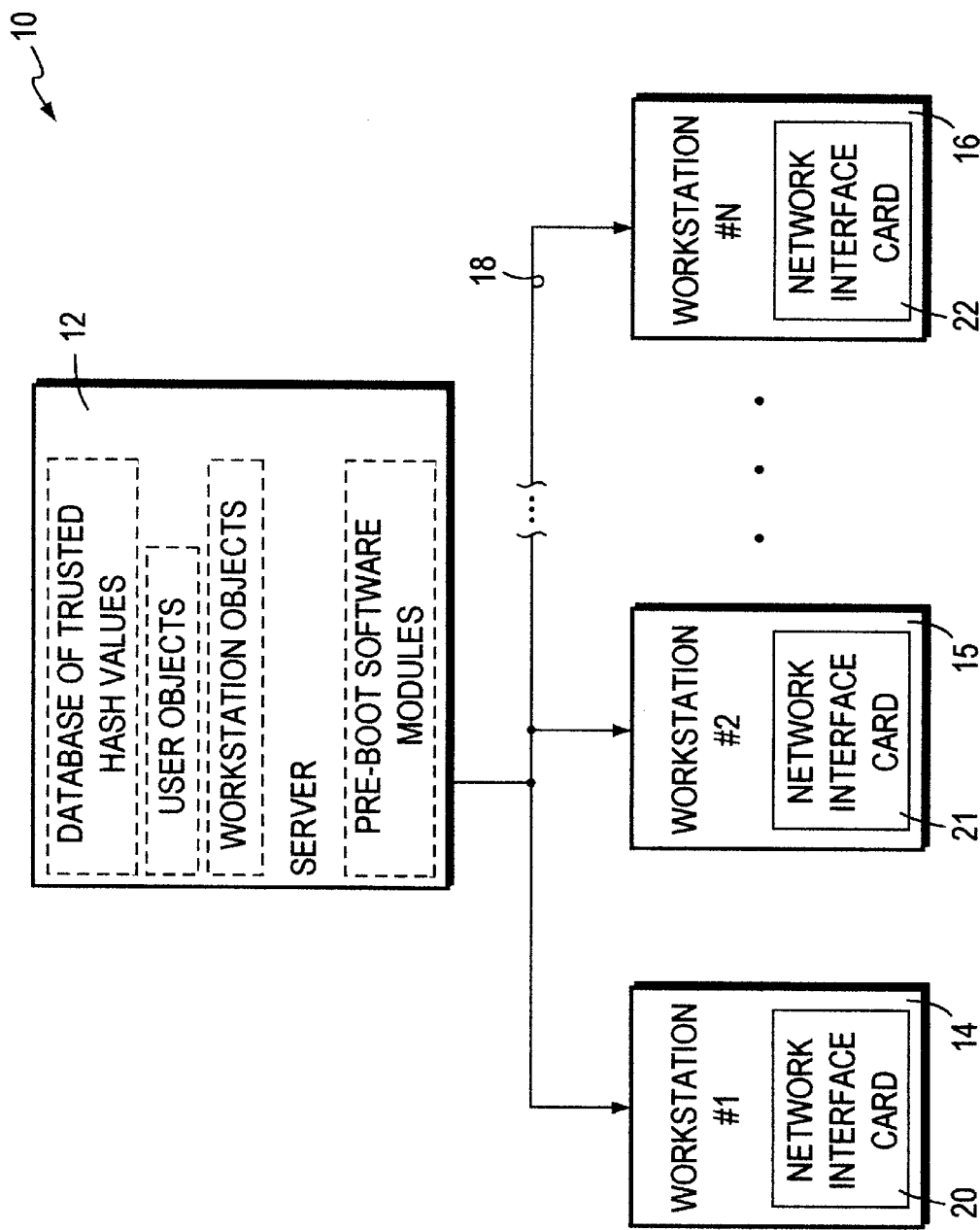
FIG. 1 is a block diagram of a networked computer system which includes a plurality of trusted workstations.

Referring to FIG. 1, a network client server computing system 10 includes a server 12 and a plurality of workstations (e.g., personal computers) 14–16. The server 12 and workstations 14–16 are interconnected via a computer network 18 such as a local area network (LAN) or a wide area network (WAN) and communicate by exchanging discrete packets or frames of data over the computer network 18 according to known network protocols. The computer network 18 may include network intermediate connections such as a router or bridge (not shown) depending upon the span of the network. Each of the workstations 14–16 includes an associated network interface card 20–22, respectively, which establishes a connection between the workstation and the server 12. The network preferably uses a distributed, replicated, synchronized directory service, such as NetWare Directory Service (NDS) available with network operating system NetWare 4.1® from Novell, Inc., the assignee of the present invention.

Figure 2:
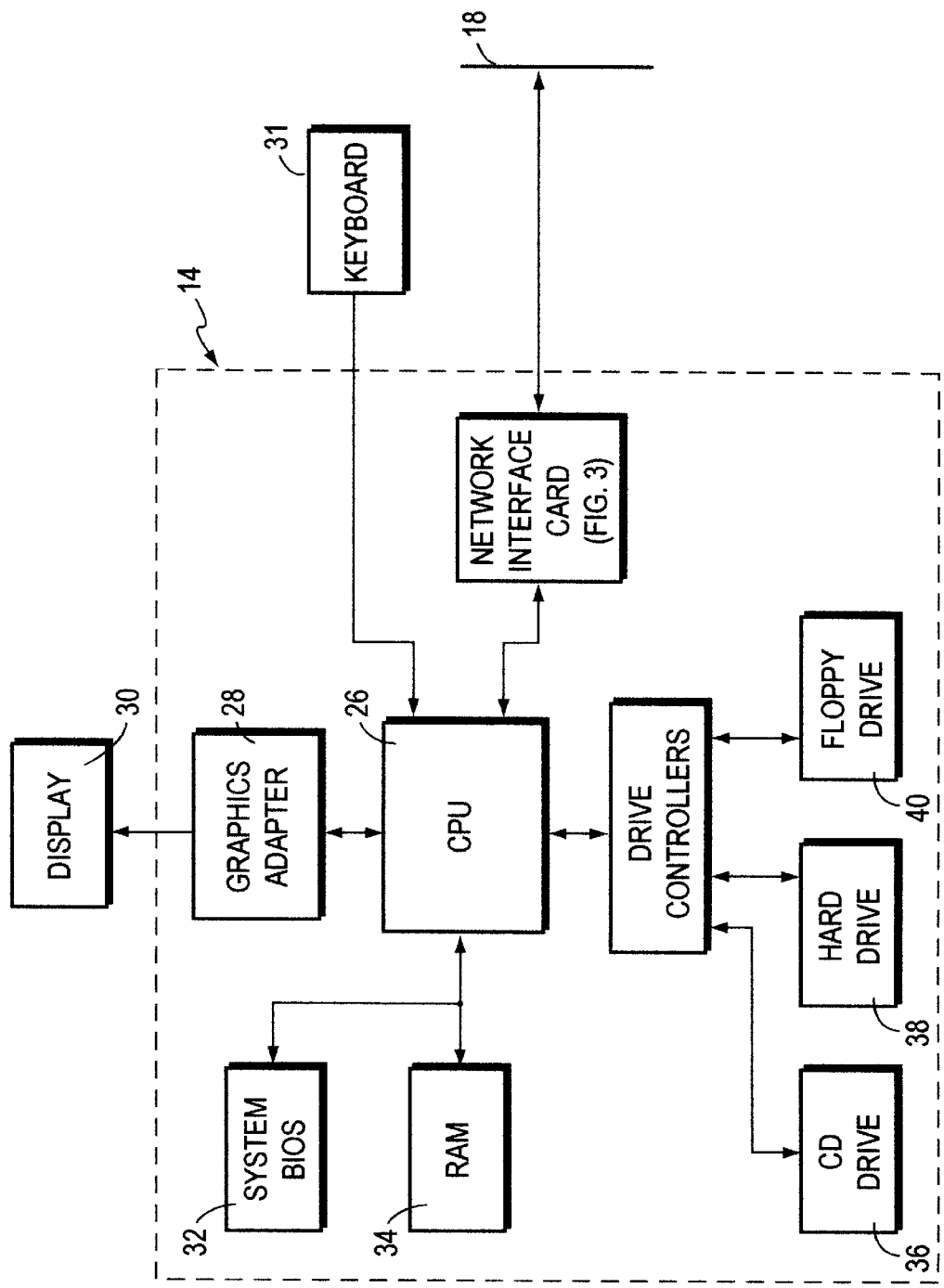
FIG. 2 is a simplified block diagram of a trusted workstation from FIG. 1.

FIG. 2 is a simplified block diagram illustration of the workstation 14. The workstation 14 includes conventional components such as a central processing unit (CPU) 26, a graphics adapter 28, system basic input/output system (BIOS) 32, and computer readable media such as RAM 34, CD drive 36, hard drive 38 and a floppy drive 40. The workstation also includes the network interface card (NIC) 20 through which the workstation communicates with the server 12 (FIG. 1) over the computer network 18. The workstation 14 is connected to a display 30 and a keyboard 31.

Figure 3:
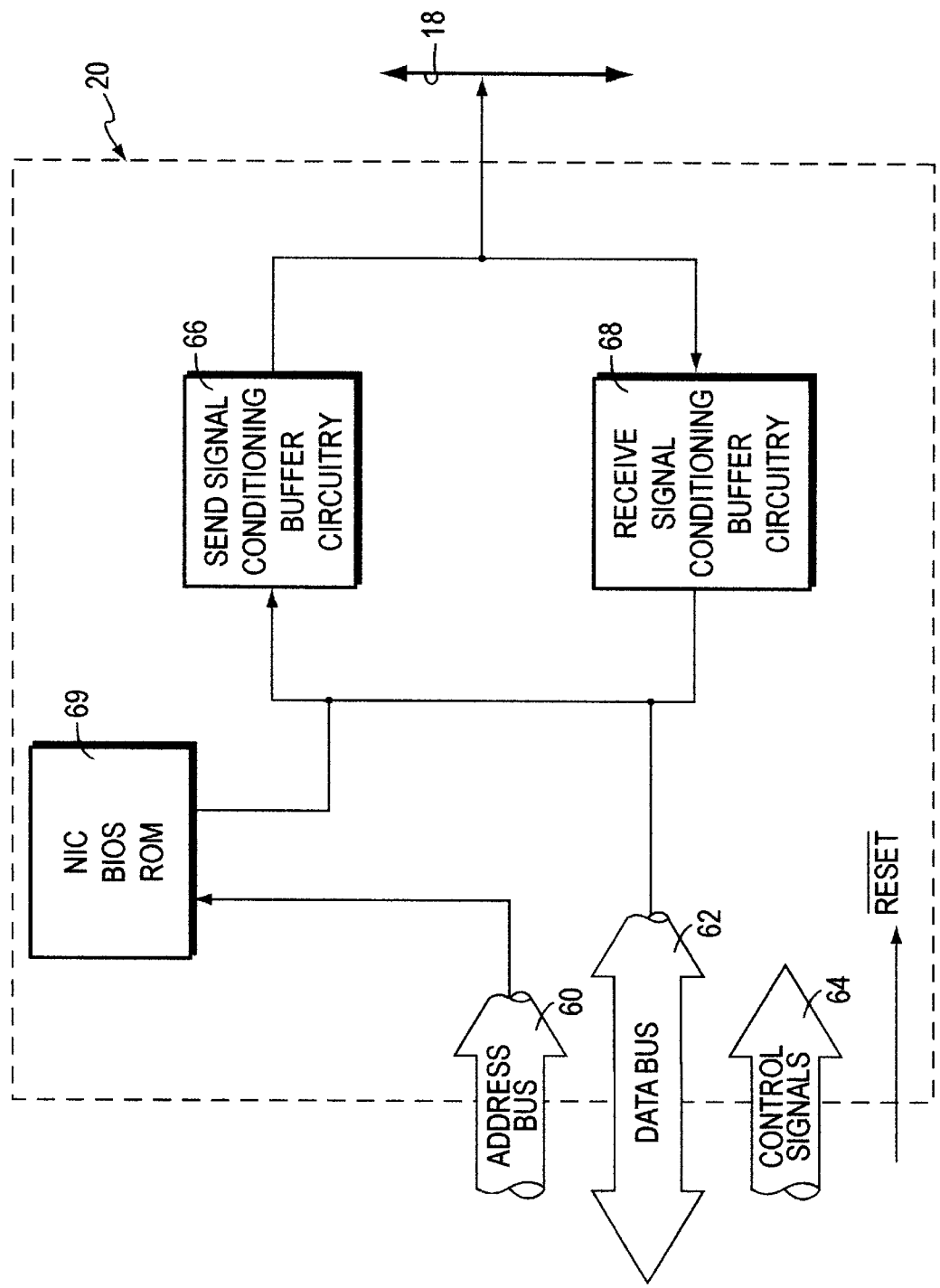
FIG. 3 is a block diagram of a network interface card resident in the trusted workstation illustrated in FIG. 2.

FIG. 3 is a schematic block diagram illustration of the NIC 20. The NIC is preferably an expansion card (e.g., ISA or PCI compatible) which is connected to the CPU 26 (FIG. 2) via an address bus 60, a data bus 62 and a control signal bus 64. The signals from these buses are routed to the various components resident on the NIC in order to perform the functions discussed hereinbelow.

The NIC 20 includes send signal conditioning buffer circuitry 66 which transmits the packet onto the computer network 18. In general, signal conditioning circuitry is well known and in the interest of brevity this circuitry shall not be discussed in detail herein. The NIC 20 also includes receive signal conditioning and buffer circuit 68 which conditions the data stream received from the network 18 and forms a received packet.

The NIC also includes a BIOS ROM 69 that contains program instructions which are executed in the CPU 26 (FIG. 2) during initialization in order to, inter alia, initiate downloading of executable pre-boot software modules resident on the server 12 (FIG. 1). The initialization sequence of the workstation shall now be discussed.

Figure 4:
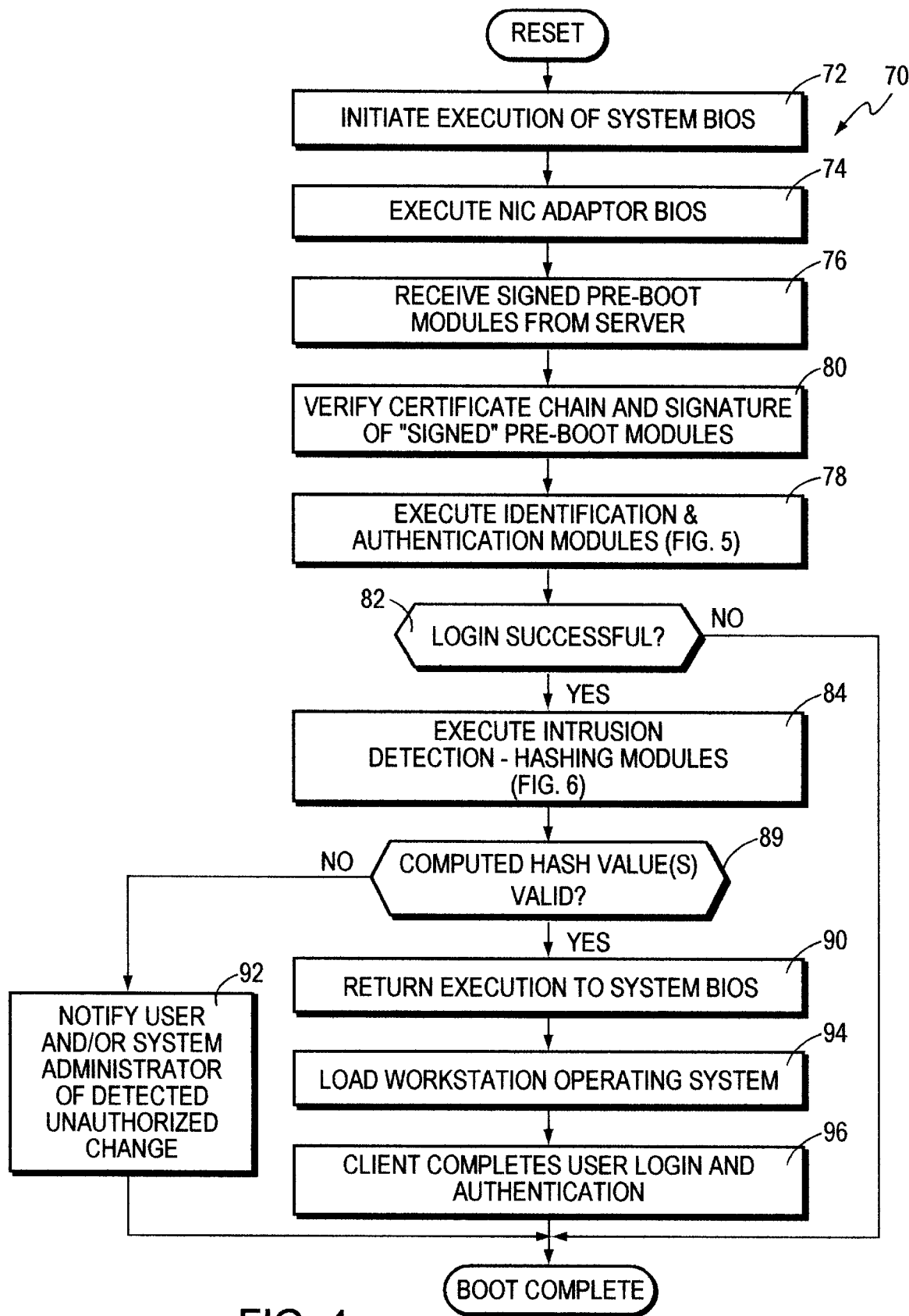
FIG. 4 is a flowchart illustration of the steps performed during system initialization.

FIG. 4 is a flowchart illustration of a series of initialization steps 70 performed by the trusted workstation 14 (FIG. 1) following a hardware reset. The series of steps includes step 72 which initiates execution of the program instructions resident in the system BIOS 32 (FIG. 2). The program instructions executed in step 72 initialize and take an inventory of the hardware resident on the main system board (i.e., the motherboard) of the workstation and the installed adapters. During this step the system BIOS calls each installed adapter board in the order of its address. The NIC BIOS generally does not have to be the first adapter BIOS called. However, in order to ensure proper system security, the NIC BIOS is preferably called prior to execution of any adapter BIOS that is software modifiable.

Initialization continues with step 74 wherein the CPU executes the program instructions resident in the NIC BIOS 69 (FIG. 3) to initialize the hardware in the NIC as necessary. Following hardware initialization, the workstation CPU provides the workstation MAC address to the server. The server then checks a server database for a workstation object corresponding to the workstation MAC address. If a workstation object exists for the workstation MAC address, the server checks the object for information indicative of the hardware and operating system of the workstation. The server selects the appropriate preboot modules based upon the workstation hardware and operating system characteristics and downloads the modules to the workstation.

If the directory server does not include an object for the workstation (based upn the workstation MAC address), the server creates a profile (i.e., a workstation object) which includes the workstation's MAC address and information about the workstation hardware and software, including the workstation operating system. In order to determine the hardware and software configuration of the user workstation, the server must download a query module with the preboot modules. The query modules provide a menu which allows the workstation user to indicate what operating system the workstation is running. The menu includes choices of known operating systems and a choice of an "unknown operating system". In response to a user selection of the "unknown operating system", the user is instructed to start his browser after the operating system has booted, and to contact a secure https site which will download a trusted Java applet to the workstation. The workstation executes the applet which determines the workstation operating system version and sends information indicative of the version to the server, which stores the version information in the workstation object. When the "unknown operating system" is selected, the intrusion detection hashing function will not be executed as part of the preboot routine.

The workstation can obtain the server address by using the known SAP advertisement protocol. The CPU then downloads the pre-boot modules from the server in step 76 and in step 78, executes these pre-boot modules to perform the identification and authorization function associated with the login process described in FIG. 5. In an alternative embodiment, the pre-boot modules may be stored in the NIC BIOS.

To enhance the security of the path between the workstation and the server, the pre-boot modules may be "signed". Preferably, only the identification and authentication modules are signed, and the remaining downloaded preboot modules are protected using session keys that result from the user authentication protocol described below. Each pre-boot module includes a different signature which the workstation uses in step 80 to verify that the received module is authentic and this prevents unauthorized replacement or modification of the downloaded pre-boot modules. In general, signing of information transmitted over a network is known, see for example the text "Network Security: Private Communication in a Public World", by C. Kaufman, R. Perlman and M. Speciner, published by Prentice Hall PTR, 1995 which is hereby incorporated by reference. To verify the certificate chain and the signature of the "signed" pre-boot modules, a root master public key (i.e., the public key associated with the highest certificate authority) is stored in the NIC BIOS ROM along with the executable code required to perform the verification of step 80.

Figure 5:
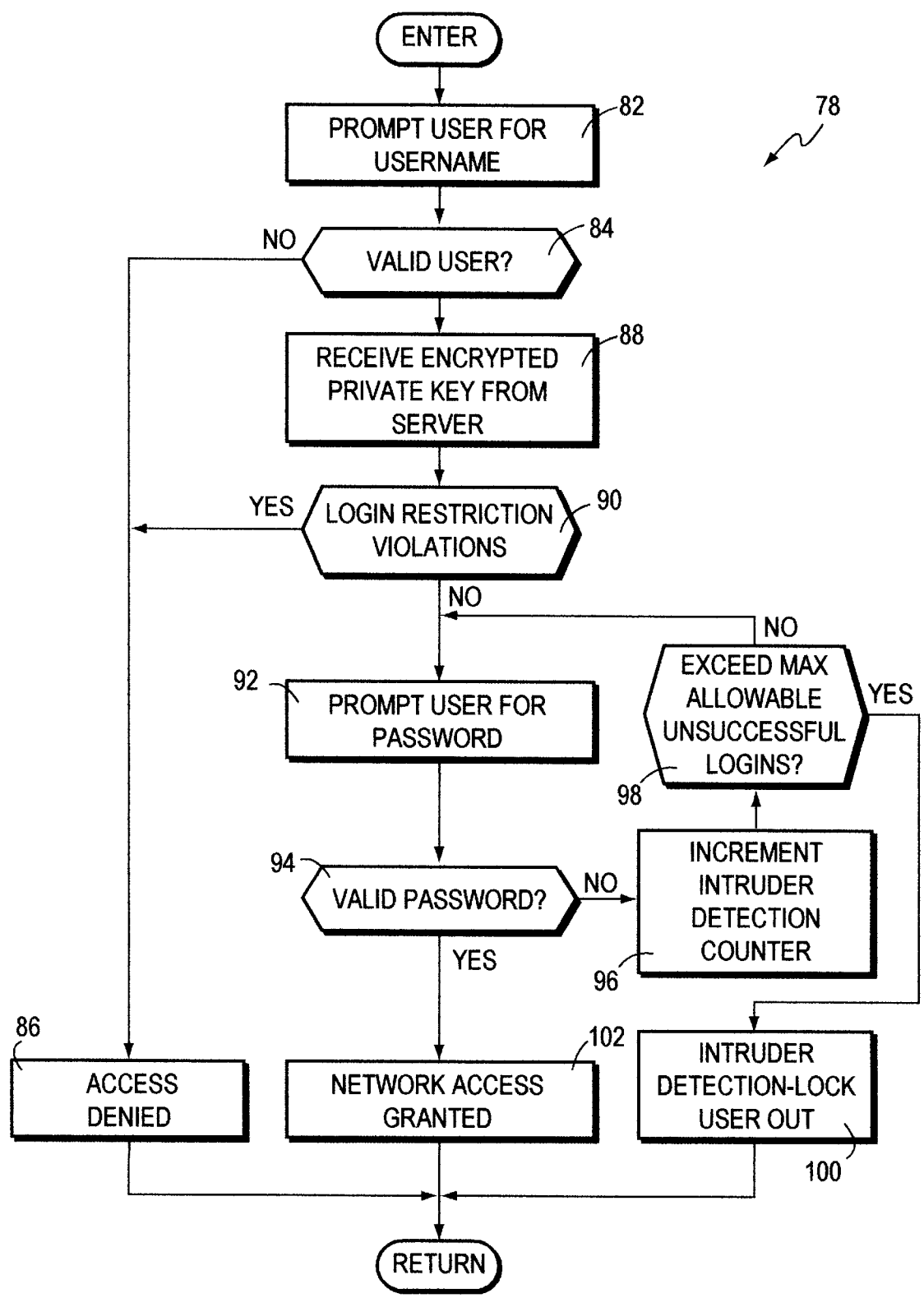
FIG. 5 is a flowchart illustration of the steps associated with the login process.

FIG. 5 is a flow chart illustration of the login process based upon NDS authentication employed in NetWare™ 4.1. In step 82 a username prompt is presented to the user. In response, the user enters a username which is transmitted to the server and in step 84 the server compares the entered username against a list of authorized users. If the username is not valid, network access is denied in step 86 and the login process ends. However, if the entered username is on the list, the server returns an encrypted private key to the workstation in step 88. The encrypted private key can only be decrypted with the user's password. In step 90 the server checks if any login restrictions, such as, time restrictions, station restrictions and account lock-out restrictions have been violated. These restrictions prevent logins from unauthorized workstations or logins during the wrong time of day. If there are violations, access is denied (step 86). However, if there are no login restrictions, the user is prompted to enter a password in step 92 and the validity of the password is determined in step 94.

Specifically, step 94 comprises a plurality of operations between the workstation and the server to verify the validity of the password while maintaining the integrity of the password transmitted over the network 18. Upon entry of the password, the workstation decrypts the encrypted private key with the password entered by the user. The workstation then erases the password from workstation memory to prevent a hacker from obtaining the password. The workstation then maintains an authenticator credential uniquely indicative of the user. The credential includes information identifying the user's complete name, the workstation source address and a validity period (i.e., the duration of time the authenticator is valid). The workstation then creates a signature using the authenticator credential and the decrypted private key. The signature is used for background authentication and to further assist in validating the authenticity of packets transmitted by the workstation onto the network. In order to complete the authentication process, the workstation creates a proof using the signature, the request for authentication and a random number. The proof is then encrypted by the workstation with the user's private key and transmitted to the server which determines if the proof is valid (this verifies that the password entered by the user was the correct password). If it is, the server transits a message to the workstation that the user properly logged onto the network and the workstation user is granted conditional access to the network (e.g., to NDS). Note, that with a network centric operating system such as Novell's NetWare® 4.1, the user logs into the network rather than into individual servers resident on the network.

If the server determines that the proof is invalid, the server increments an intruder detection counter in step 96. In step 98 the server compares the value of the counter with a predetermined maximum value to prevent logins by the user (step 100) if there have been a number of unsuccessful attempts to enter the correct password. If a valid proof is transmitted to the server, network access is granted in step 102 (note the proof will only be valid if the user entered the correct password). In step 100, the NIC may be disabled to prevent subsequent workstation/server communication, while still allowing the workstation to operate as a public object (i.e., as a stand alone workstation). Alternatively, the workstation may be completely disabled, for example, by not loading the operating system from the server.

Alternatively, it is contemplated that well known password based user authentication systems such as Kerberos V4 or Kerberos V5 may be used to provide user identification and authentication. However, any user authentication protocol can be used.

Step 82 is executed to determine if the user was successfully identified and authorized, and if so, the intrusion detection hashing function is executed by the workstation in step 84. If the login was unsuccessful, the boot sequence is terminated unsuccessfully.

Figure 6:
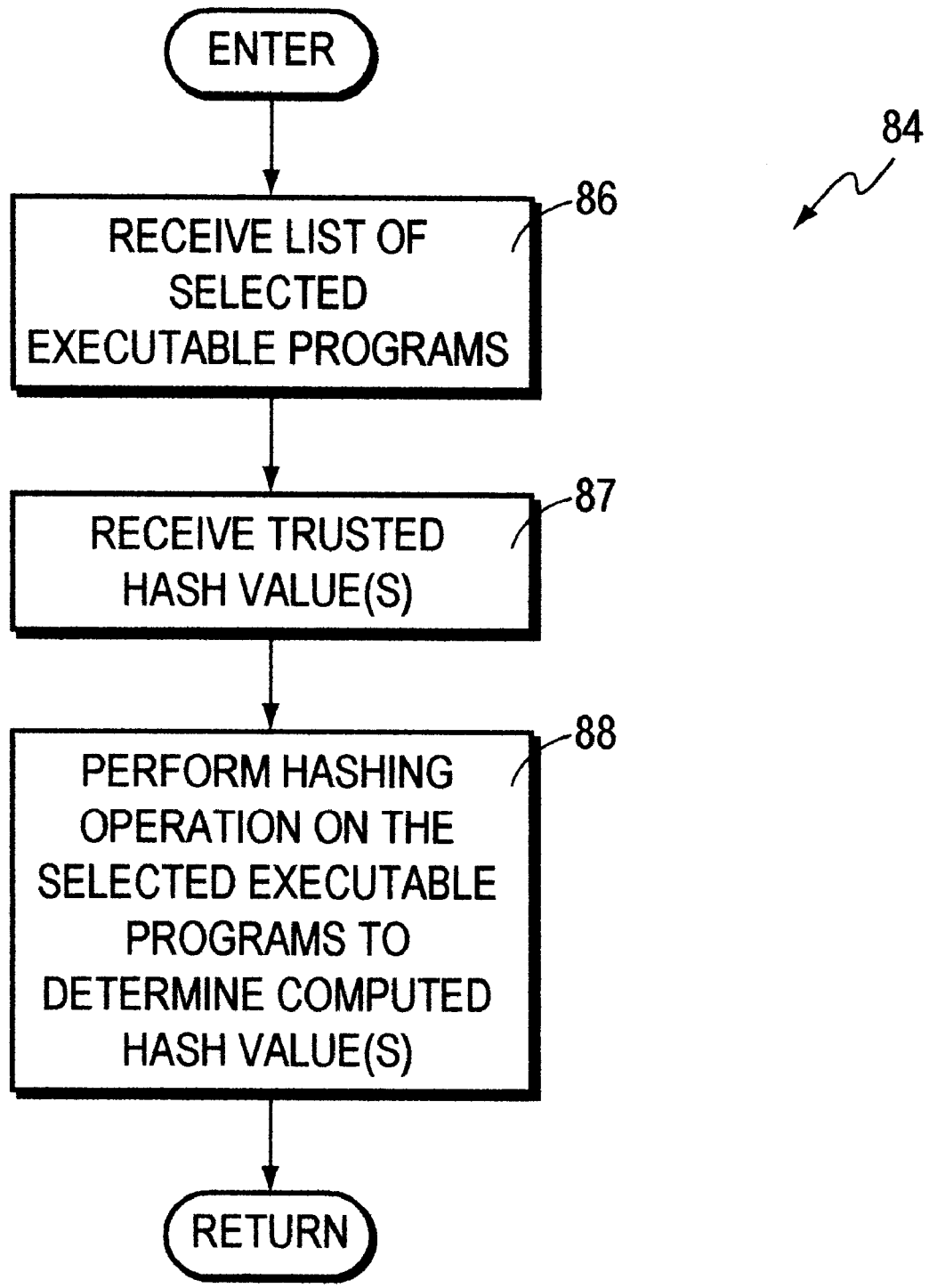
FIG. 6 is a flowchart illustration of the steps performed by the workstation during the intrusion detection check.

Referring to FIG. 6, step 86 involves receiving a list of the selected workstation executable programs to be checked by the intrusion detection hashing function. To determine the selected programs, the server accesses the workstation object and a user object to determine the executables resident on the user's workstation. From this list the server preferably selects any browsers, mail programs and operating system components (e.g., the operating system kernel) which are highly susceptible to attack. The server will also select several other remaining executable programs on a random basis, with a goal of checking all the workstation executable programs within a reasonable number of workstation resets. Once this selection is complete, the server provides the workstation with the list of selected workstation executable programs.

In step 87 the workstation receives the trusted hash value(s) associated with the selected workstation executable programs identified by the server. The server can compute the trusted hash value(s) by performing the hashing function on trusted copies of the selected workstation executable programs stored in the server. Alternatively, the server may include a database (FIG. 1) of trusted hash values each uniquely associated with an executable program. Step 88 is then executed to perform the intrusion detection hashing operation on the selected executable programs.

A preferred hashing algorithm is a secure hash algorithm (SHA-1) which is sponsored by the National Institute of Standards and Technology (NIST), formerly known as the National Bureau of Standards (NBS). However, it is contemplated that any other suitable hashing algorithm may be used. A detailed discussion of hashing is set forth in the text "Network Security: Private Communications In A Public World", by C. Kaufman, R. Perlman and M. Speciner, published by Prentice Hall PTR, 1995. When complete, the hashing function executed in step 88 provides a computed hash value. Alternatively, a computed hash value may be calculated separately for each selected workstation executable program. In this embodiment, a plurality of trusted hash values are downloaded to the workstation, each of which is uniquely associated with one of the selected programs. Advantageously, providing a trusted hash value for each selected executable program facilitates determining which of the selected executable programs has been corrupted.

Referring again to FIG. 4, in step 89 the workstation compares a computed hash value against the trusted hash value. If the values are equal then illicit changes have not been made to the selected executables programs, and execution continues with step 90 which returns workstation execution to the system BIOS. Otherwise, step 92 is performed to notify the user, and/or the network system administrator, that an unauthorized change has been detected. The workstation may also make an entry in an audit server audit log and/or download a "clean" copy of the executable program which was detected to have the illicit change. In step 94 the workstation operating system software is loaded from the server, and the user login and authentication process is completed in step 96.

One of ordinary skill in the art will recognize that the present invention is capable of operating with various workstation operating systems, including UNIX, Windows 95, Window 3.1/DOS, Windows NT, Operating System 8, etc.

Although the present invention has been shown and described with respect to preferred embodiments thereof, it should be understood by those skilled in the art that various other changes, omissions and additions to the form and detail thereof, may be made therein without departing from the spirit and scope of the invention.

What is claimed is:

1. A method of detecting illicit changes to an executable program in a networked computer workstation prior to execution of an operating system by the workstation, the method comprising the steps of:
    receiving a trusted hash value that is expected to be generated by hashing selected executable programs resident in the workstation if the selected executable programs have not been unauthorizedly changed;
    receiving a list of the selected executable programs resident in the workstation;
    hashing the selected executable programs resident in the workstation to calculate a computed hash value; and
    comparing said computed hash value to said trusted hash value in order to detect illicit changes to the selected executable programs;
    wherein the computed hash value is a fixed size numerical value, and the selected executable programs comprise program instructions for being executed by the networked computer workstation.

2. The method of claim 1, further comprising the step of:
    issuing a notification that an illicit change of the selected executable programs has been detected.

3. The method of claim 1, wherein said step of hashing includes using a SHA-1 hashing algorithm to hash the selected executable programs.

4. The method of claim 1, further comprising the step of:
    prior to said steps of receiving, transmitting information indicative of the workstation user to a server networked to the computer workstation.

5. The method of claim 1, wherein said trusted hash value is signed.

6. The method of claim 1, further comprising the steps of:
    receiving a plurality of preboot modules; and
    executing said plurality of preboot modules.

7. The method of claim 6, wherein said plurality of preboot modules are signed preboot modules, and said method further comprises a step of checking that said signed preboot modules have been received correctly.

8. A network computer workstation which checks for illicit changes to executable programs in the workstation prior to execution of an operating system by the workstation, the workstation comprising:
    means for receiving a trusted hash value and for receiving a list of selected executable programs resident in the workstation;
    means for hashing the selected executable programs resident in the workstation to calculate a computed hash value;
    means for comparing said computed hash value to said trusted hash value in order to detect illicit changes to the selected executable programs;
    wherein the selected executable programs comprise program instructions for being executed by the workstation, and each of the computed hash value and the trusted hash value is a respective fixed size numerical value.

9. The workstation of claim 8 further comprising means for issuing a notification that an illicit change of the selected executable programs has been detected.

10. The workstation of claim 8, wherein said means for hashing uses a SHA-1 hashing algorithm to hash the selected executable programs.

11. The workstation of claim 8, further comprising means for transmitting information indicative of the workstation user to a server networked to the workstation.

12. A method for detecting illicit changes to executable programs in a workstation of a networked client/server computer system following a reset of the workstation and prior to execution of an operating system by the workstation, the method comprising the steps of:
    receiving at the workstation a plurality of preboot executable software modules;
    receiving at the workstation a trusted hash value;
    receiving at the workstation information indicative of a selected executable program resident in the workstation;
    executing said plurality of preboot executable software modules which includes the steps of:
        (1) hashing the selected executable program resident in the workstation to calculate a computed hash value; and (2) comparing said computed hash value to said trusted hash value in order to detect illicit changes to the selected executable program;

wherein the selected executable program comprises program instruction for being executed by the workstation, and the trusted hash and computed hash values are fixed size numerical values.

13. The method of claim 12, including the step of transmitting to the server information indicative of the workstation user.

14. The method of claim 13, further comprising the step of selecting a workstation profile at the server based upon the workstation user, and choosing said selected executable programs based upon said user profile.

15. The method of claim 13, further comprising the step of transmitting to the server information indicative of the workstation.

16. The method of claim 15, further comprising the steps of selecting a user object at the server based upon the workstation user, selecting a workstation object based upon the workstation identifier, and choosing said selected executable programs based upon said user object and said workstation object.

* * * * *